Oct. 11, 1932.  A. C. FISCHER  1,881,439

PACKING

Original Filed June 4, 1920

Inventor:
Albert C. Fischer,
By Ballard Moore atty

Patented Oct. 11, 1932

1,881,439

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

PACKING

Original application filed June 4, 1920, Serial No. 386,609. Divided and this application filed July 23, 1927. Serial No. 207,954.

This invention relates to constructional materials and more particularly to a waterproofing mastic packing adapted to be made in preformed strips or various shapes, or carried on or within a vehicle or container, such as a fabric or felt.

The main object of my invention is to provide a substantially soft or readily deformable, preformed packing for the purposes hereinafter set forth, which has sufficient body to enable it to be handled in merchandising and yet act as a very malleable packing of inherently and lastingly adhesive, and waterproofing qualities, so that it serves most excellently as a cheap, convenient, leakproof, waterproof and adherent packing for openings, cracks, crevices, joints and interstices between joints or overlapping members.

My invention has also for its object to provide a mastic or bituminous packing of the above character containing materials through means of which to determine at will, the degree of fluidity, elasticity and adhesiveness, as well as the duration of the adhesiveness of the mastic substance of which the packing is formed, so that the mastic, or the carrier itself treated therewith, may be conditioned to meet varying requirements of the packing upon its arrival on the job; in other words one of the objects of my invention is to permit shipping the packing in such a state that even after having remained in the warehouse through varying temperatures, it will remain in commercially satisfactory condition until it reaches the final consumer, and particularly the condition of self and lasting adhesiveness of my mastic as disclosed in my copending application Serial No. 336,713, filed November 8, 1919 and my Patent No. 1,592,760, issued July 13, 1926, reference to which is made as a part hereof as a disclosure of such mastics.

The mastic of which my improved packing is composed is formed at the place of manufacture and has the inherent quality of maintaining its condition during that interval which may reasonably be expected to elapse between the manufacture of the goods and their application. This inherent condition insures the provision of a packing having substantially lasting adhesiveness, permanent plasticity in a mass of sufficient volume to afford an effective packing or filler for spaces or joints between members, and which also forms means for interlocking and preventing leakage between the surfaces forming the openings or joint, or between the overlapping members.

In certain instances where it is desirable to employ a mastic body that has maintained plasticity and adhesiveness, for joint packing purposes, so that it will conform to irregularities between bodies, in crevices, cracks, between overlapping members, or provide a substantial coating over porous substances and coverings, the inherent quality of the mastic to insure retention of mass and form will be brought out therein by incorporating therein a filler, or other ingredient in sufficient proportion to the base of the mastic to prevent running or flowing under any temperature to which the mastic, or the material on which it is placed, may be subjected in storage, or in the use for which it is intended. Any subdivided filler may be employed to give the base the proper mastic body. Such a filler may consist of fibers, which have either the property of absorbing the oil and holding it in suspension, or the property of interfering with the flow. These fibers should not exceed about twenty-five per cent. The fibers will act as a reinforcing means and also as a flow retarder by holding the basic bituminous or mastic substance in suspension. By means of these fibers any desired flow point or melting point and bulk may be imparted to the mastic, and this is accomplished by selecting the base used and the proportion of filler or fiber used. The fiber also acts as a holding medium against the force of gravity, such for instance as when the packing is positioned in the cracks or openings between the overlapping members, as for instance in joint packing, and this also applies when the medium is used for coating purposes. The fiber further acts as a bulk filler in these instances, as it assists in conforming to these spaces and irregularities, which otherwise might allow leakage, infiltration of water or other liquid to be excluded.

Where it is desired to impart to the bituminous, or other mastic, a gummy or marked adhesive characteristic so that it can with advantage be placed within an enclosing carrier, and yet permit a portion of the carrier to be pulled apart, or slightly separated from the mastic for desired purposes, the bituminous or other mastic is combined with resin, gum, non-drying oils and boiled linseed oil or a compound allied in physical characteristics to the commercial article known as "tree tanglefoot". This will also have the effect of retarding the drying or prolong the stickiness of the mastic, and will cause it to break apart when the carrier is separated from it, instead of drawing out into a stringy condition. The addition of these ingredients or this substance to bituminous bases or mastics containing volatile oils, retards the evaporation of the volatile oils and continues the properties of such slow drying mastic for a prolonged period. Where a packing is desired without great stickiness but mainly with plasticity which will adapt it to enter between the overlapping members, into the cracks or fill the joints or the other openings, or over porous surfaces, the same base is used with a non-drying oil which destroys the stickiness but maintains the mastic quality, than any one or more of the fillers hereinbefore set forth in my prior application Serial No. 386,609, filed June 4, 1920, of which this application is a division, are added to give bulk to the mass and raise its flowing point.

Referring now to the drawing.

Figure 1:
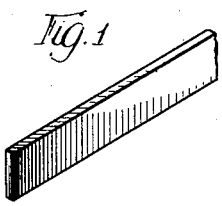
Figure 1 shows a preformed strip of my packing mastic.

Referring now specifically to Figure 1 of the drawing. The preformed strip therein shown is composed of my specially prepared mastic which is lastingly adhesive and is so malleable and readily deformable that when compressed it will elongate and adapt itself to irregularities existing between these surfaces and will form a most excellent commercial packing for cracks, crevices, openings or joints. This preformed, plastic packing strip is normally sticky and tacky and is of slow drying nature. It is distinguished from ordinary asphaltic material by its ability to maintain its preformed shape while at the same time possessing the requisite ductility and plasticity required as such a preformed packing strip.

My preformed packing shown in this figure is composed of a mastic preferably produced by using a tacky asphaltic material, such for instance, as one of the well known types of macadam binders, which, as is known in the art, are normally sticky and tacky and of slow drying nature and are lastingly adhesive. I add to or incorporate in such macadam binder a filler or flow retarder so as to provide sufficient stability to the given product to enable it to be handled and to be preformed into a strip or shape of desired size and cross-section for the purpose set forth. This packing material, while maintaining its own form is of such a nature as to be readily deformable so that when forced or pressed into the joint to be packed it will conform to the irregularities of the surfaces into which it is inserted. In all instances the filler or flow retarder added must not exceed substantially twenty-five per cent.

In another form of my invention for making these preformed packings, such for instance as is shown in Figure 1, I utilize one of the ordinary macadam binders, as just before mentioned, or a heavy, sticky, petroleum residue as a base, and add the flow retarder in proportions as hereinbefore set forth.

In still another form residual asphaltic fluxes may be blown to any extent so that the material will hold its form, yet retain the quality of lasting adhesiveness and ready deformability.

In yet another modified form of my packing, such for instance as disclosed in Figure 1, I propose to use any type of mastic binder of flowable nature, a macadam binder above described being one such, and to check its normal flowability by the addition of latex in about two to five per cent, or by the addition of about twenty per cent high melting point asphalt, which proportion is of sufficient quantity to enable the strip to maintain its preformed shape.

In still another form of this preformed packing, the binder is treated by the addition of a mineral filler, such as, clay, fuller's earth or kieselguhr. The amount of filler may be varied to control the deformability. This mineral filler retards the flow of the binder or mastic.

In some instances it is desired to have the surface of the preformed packing more or less tacky, and this can be provided by coating the exterior surface of the strip with a lasting adhesive of any of the types of material herein disclosed.

It is also within the contemplation of my invention to utilize other binders which are not of bituminous nature, for instance, such as, resin-rubber combinations, having oil added and filled with clay or other suitable mineral filler, such as, berites, kieselguhr and the like. Such a binder would include a heavy flux oil and reclaimed rubber. Preferably a flux oil is used in which the flux oil is reduced to such a condition that when a ball of it is set upon a flat surface it will ultimately flatten out in higher normal temperatures. In these resin-rubber combinations the rubber is about ten per cent, the flux oil about ninety per cent and the resin about two per cent, or there may be used ten per cent reclaimed rubber and substantially eighty-eight per cent flux oil or bituminous material, and the remainder clay or mineral filler.

In instances where I utilize a binder or mastic formed of resin and rubber combinations the same is normally tacky provided the oil present is sufficient to allow the natural tackiness in rubber and resin to function. In other instances where the binder or mastic is formed of clay and oil combinations the oil must be of such nature as to have the lasting tackiness inherent in the oil.

I do not desire to be limited to the exact materials used in making this packing because any type of binder or mastic having the qualities hereinbefore set forth may be utilized. Furthermore, it will be evident from certain figures of the drawing that my invention also contemplates the use of the binder in combination with certain fibers.

Figure 2:
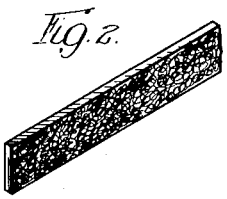
Figure 2 shows a similar strip having fiber incorporated therein.

In the specific form of preformed packing illustrated in Figure 2 of the drawing the adhesive material has fiber distributed homogeneously therethru. This fiber is preferably but not necessarily a finely divided fiber-like felt fiber.

On the contrary my invention also contemplates the use of linear, coarse, or relatively coarse fibers; or alternatively the invention contemplates the use of mixed fine and coarse fibers. In some instances these long fibers may be two or three inches in length; for the coarser fibers I have in mind the utilization of flax, jute, hemp, sisal, and cocoanut fibers.

Figure 3:
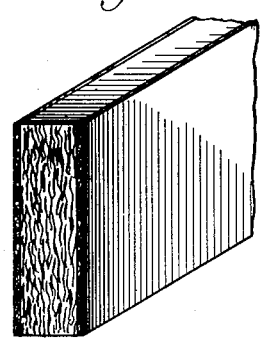
Figure 3 shows the fibrated plastic mastic held together between two saturated felt sheets.
Figure 4:
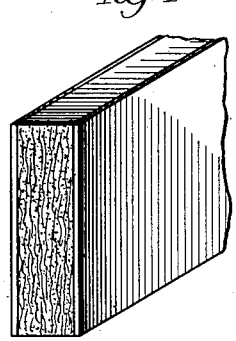
Figure 4 shows this plastic normally tacky adhesive material held together between two layers of saturated felt or suitable vehicle, the normally tacky adhesive having mineral matter or fibers, or both, distributed therethru.

In another form of my preformed packing I provide the mastic or binder as hereinbefore disclosed, either fibrated, as in Figure 3, or provided with mineral matter incorporated therein as in Figure 4, and with or without fibers. In this figure the mastic is disposed between two felt or woven fabric sheets, saturated with a lasting adhesive of the types herein disclosed. In addition, this form of my preformed packing contemplates the use of sheet fabric facings, either saturated with the described adhesive or left unsaturated. When left unsaturated they may be treated with a suitable solvent, such as, kerosene, to render them adhesive when necessary.

In the enclosed or encased forms of my preformed packing, as shown in the drawing, the contained material is the lasting adhesive heretofore mentioned. Preferably but not necessarily this lasting adhesive is more fluent or softer. By adding mineral matter this flowable material may be set up so as to permanently maintain its form, but with its enclosed sheath it can be softer since the sheath assists in maintaining its form. Alternatively by adding fibrous material to this enclosed mastic, as hereinbefore disclosed, the form of the strip is rendered more stable. In each instance the material forming the inner or core part of the packing is normally tacky and lastingly adhesive to the touch.

Figure 5:
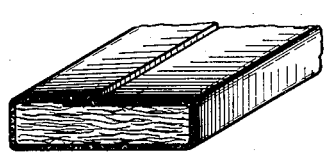
Figure 5 shows the mastic confined or held within a vehicle.

In that form of my prepared packing illustrated in Figure 5 the solid mastic interior is confined within or covered with a vehicle of lastingly sticky adhesive of bituminous or other composition as hereinbefore disclosed. The vehicle may be a piece of woven material or felt or paper. In some instances the vehicle may be free from saturation, or the lasting stickiness may be attained by treating a normally non-adhesive coating with a solvent, such as, kerosene or benzol.

Figure 6:
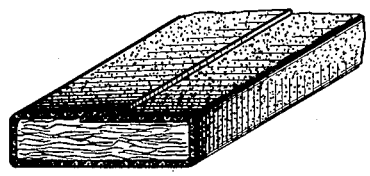
Figure 6 shows my mastic packing wherein the body of the mastic within the vehicle has fiber distributed therethru and wherein the vehicle is saturated and coated with a sticky mastic of lasting adhesiveness.

In Figure 6 the packing is shown as having a preferably fibrated center or core, although it may be unfibrated. This center or core is shown as contained within an envelope or enclosing carrier of sheet material, such as, woven fabric, felt, paper or other suitable material, which likewise may be saturated with adhesive material to render it normally tacky or sticky. The container may be unsaturated if desired.

Figure 7:
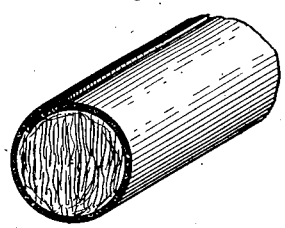
Figure 7 illustrates a round form of my packing material.

Figure 7 shows a plain, unfibrated binder enclosed within an unsaturated fabric.

Figure 8:
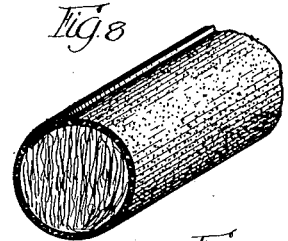
Figure 8 is a similar construction wherein the mastic has fiber incorporated therein, the vehicle being coated with a lasting adhesive.

Figure 8 shows a fibrated binder enclosed within a saturated vehicle, the vehicle being coated with a lasting adhesive.

Figure 9:
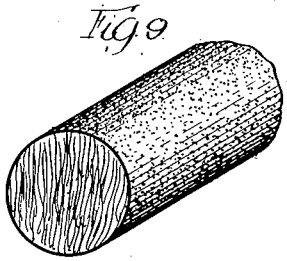
Figure 9 is a round form of the preformed mastic without an enclosing vehicle but coated with a lasting adhesive.
Figure 10:
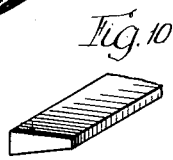
Figures 10, 11, 12 and 13 are various types of the preformed packing without an enclosing vehicle.
Figure 11:
Figure 12:
Figure 13:
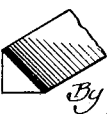

Figure 9 shows a preformed strip of fibrated mastic of lasting adhesiveness, which is of denser body and wherein a coating of lasting adhesiveness is placed so as to enclose the inner core.

Figures 10 to 13 show various forms of my packing in which the mastic of lasting adhesiveness is furnished for the purpose of packing various shaped openings between joints, overlapping members and structural elements.

Where talc is utilized for separating the preformed strips of various kinds shown in my drawing, during shipping, it is desirable to immerse the strips in a solvent, such as, kerosene, in order to restore the tacky surface.

In certain forms of my packing the mastic of lasting adhesiveness is enclosed or partly enclosed with a waterproofing material for the purpose of carrying, aiding and maintaining the form of the mastic under pressure, as for instance, as shown in Figures 3 to 8 inclusive. In most instances this vehicle is forced apart so that the mastic can ooze out and thereby at least a portion of the mastic can be exposed to the surface where the overlapped edges or the abutting edges of the vehicle are separated. In certain other instances the overlapped edges are effectively secured so as to prevent their separation.

The function of the enclosing vehicle is to confine the mastic of lasting adhesiveness, and where such a vehicle is used, as before stated, the mastic may be of softer or more fluid nature if desired. The mastic is placed in or between the vehicle at the factory from which the vehicle is shipped.

Where the vehicle is not used I prefer to incorporate fibers in the mastic to reinforce it so as to enable it to retain its form and shape. So also in such instances the strips of packing may be treated with talc, soapstone, or some other such substance which will enable the packing to remain separated from other packing pieces during shipment. The use of this talc or soapstone is not essential.

As a further modification of my packing I provide a mastic having an unsaturated vehicle which is utilized for carrying the mastic, and then by immersing the mastic which is on or within the vehicle in kerosene or other solvent, sufficient of the mastic will be dissolved not only to saturate the vehicle but to provide a coating of lasting adhesiveness upon its surface, the purpose being to make the material function better in adhering to the sides of the structural unit in which it is packed.

I claim:

1. A preformed packing consisting of a bituminous base of lasting adhesiveness and a filler, the base and filler being of such proportions as to render the preformed strip readily deformable while preserving its shape and its quality of lasting adhesiveness.

2. A preformed packing comprising a fibrated mastic of lasting adhesiveness, the strip being readily deformable, of predetermined shape and of lasting adhesiveness.

3. A preformed packing composed of bituminous mastic of lasting adhesiveness, and containing a flow retarder in sufficient proportion to maintain the shape of the packing while insuring its quality of lasting adhesiveness.

4. A preformed packing comprising a lastingly adhesive mastic and having incorporated therein reinforcing and flow retarding means in sufficient quantity so that the mastic is readily compressible yet retains its preformed shape.

5. A preformed packing consisting of an adhesive bituminous base and a filler, the base and filler being of such proportions as to render the preformed strip readily deformable while preserving its shape and its quality of adhesiveness.

6. A preformed packing comprising an adhesive mastic having incorporated therein reinforcing and flow retarding means in sufficient quantity so that the mastic is readily compressible yet retains its preformed shape.

7. A preformed packing comprising a bituminous adhesive base and a filler, the base and filler being of such proportions as to render the preformed strip readily deformable under pressure while preserving the quality of adhesiveness.

Signed at Chicago, Illinois, this 16th day of July 1927.

ALBERT C. FISCHER.